(12) United States Patent
Yu et al.

(10) Patent No.: US 12,557,142 B2
(45) Date of Patent: Feb. 17, 2026

(54) Wi-Fi 6E ENHANCEMENT IN CONTENTION-BASED PROTOCOL

(71) Applicant: NETGEAR, Inc., San Jose, CA (US)

(72) Inventors: Shunliang Yu, Milpitas, CA (US);
Henry Chen, Sunnyvale, CA (US);
Tracy Ma, San Jose, CA (US);
Lavanya Bale, Milpitas, CA (US);
Mithun Nagesh, Santa Clara, CA (US);
Hsin Chung Li, Taipei (TW); Tank Liao, New Taipei (TW); Yu Te Lin, Taipei (TW); Joseph Amalan Arul Emmanuel, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 338 days.

(21) Appl. No.: 18/145,265

(22) Filed: Dec. 22, 2022

(65) Prior Publication Data
US 2024/0215068 A1    Jun. 27, 2024

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ................................................ H04W 74/0866
See application file for complete search history.

(56) References Cited

U.S. PATENT DOCUMENTS

| | | | |
|---|---|---|---|
| 2004/0039817 A1* | 2/2004 | Lee | H04W 24/00 709/225 |
| 2006/0159003 A1* | 7/2006 | Nanda | H04W 16/10 375/132 |
| 2009/0067354 A1* | 3/2009 | Gao | H04W 72/542 370/360 |
| 2014/0016568 A1* | 1/2014 | Koskela | H04W 52/0219 370/329 |
| 2023/0008481 A1* | 1/2023 | Ina | H04W 74/0866 |

* cited by examiner

*Primary Examiner* — James P Duffy
(74) *Attorney, Agent, or Firm* — PERKINS COIE LLP

(57) ABSTRACT

Apparatuses and systems for Wi-Fi 6E enhancement in contention-based protocol are disclosed. The disclosed methods enable a Wi-Fi 6E system to transmit a Channel Switch Announcement (CSA) to enhance the Wi-Fi performance. The disclosed systems preclude bandwidth reduction and interrupted transmission, which can occur using traditional methods.

18 Claims, 6 Drawing Sheets

Wi-Fi 6E ENHANCEMENT IN CONTENTION-BASED PROTOCOL

TECHNICAL FIELD

The present disclosure is generally related to deploying wireless connectivity.

BACKGROUND

Internet speeds and Wi-Fi have improved recently. However, wireless networks can slow down when client devices are too far from a router. The further a client device is from a router, the more unreliable the connection and its throughput. Moreover, a lack of bandwidth can affect wireless networks, for example, when multiple client devices are in use, the network is spread thin or the access speed slows down.

DETAILED DESCRIPTION

Figure 1A:
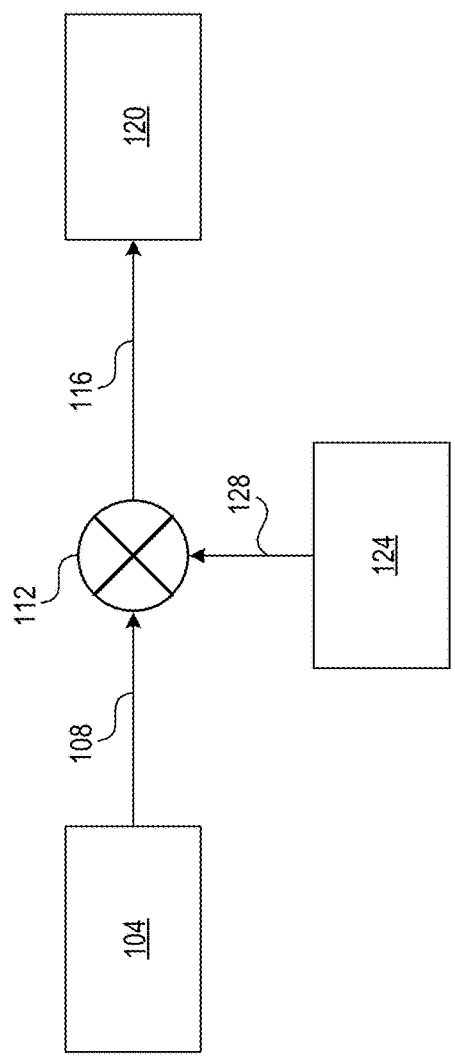
FIG. 1a is a drawing illustrating an example system flow for Wi-Fi 6E, in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610a") described as a single instance. Further, plural instances (e.g., "610") refer collectively to a set of components, operations, or structures (e.g., "610a") described as a single instance. The description of a single component (e.g., "610a") applies equally to a like-numbered component (e.g., "610b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

The Wi-Fi 6E spectrum has incumbent users, including satellite and terrestrial microwave links. Similar to the radar services lower in the 5 Ghz band, these incumbent services need protection from interference. Regulatory compliance bodies like European Telecommunications Standards Institute (ETSI) and the US Federal Communications Commission (FCC) announced the new test requirements for wireless devices that operate in the new band.

The embodiments disclosed herein describe methods, apparatuses, and systems for Wi-Fi 6E enhancement in contention-based protocol. In embodiments, a wireless transceiver, such as a wireless local area network (LAN) access point (AP) transmits wireless transmission to a wireless device in a first communication channel of a 6 Gigahertz (Ghz) band. The wireless transceiver receives radio signals in the first communication channel from another wireless access point. The wireless transceiver continually monitors the radio signals for incumbent traffic in the 6 Ghz band. The wireless transceiver detects the incumbent traffic in the first communication channel. In response to detecting the incumbent traffic in the first communication channel, the wireless transceiver stops the wireless transmission to the wireless device in the first communication channel in accordance with the contention-based protocol. The wireless transceiver transmits at least one of a channel switch announcement (CSA), a duplicate beacon, or CSA information in a second communication channel of the 6 Ghz band. In response to transmitting the at least one of a CSA, a duplicate beacon, or CSA information, the wireless transceiver switches the wireless transmission to the wireless device to the second communication channel.

In embodiments, the wireless transceiver determines absence of the incumbent traffic in the first communication channel. In response to determining the absence of the incumbent traffic, the wireless transceiver switches the wireless transmission to the wireless device to the first communication channel.

In embodiments, the wireless transmission to the wireless device in the first communication channel is performed using a first bandwidth. In response to detecting the incumbent traffic in the first communication channel, the wireless transmission to the wireless device is performed in the first communication channel using a second bandwidth less than the first bandwidth.

In embodiments, the wireless transmission to the wireless device in the first communication channel is performed using a particular bandwidth. The wireless transmission to the wireless device in the second communication channel is performed using the particular bandwidth.

In embodiments, detecting the incumbent traffic in the first communication channel comprises determining presence of Additive White Gaussian Noise (AWGN) in the first communication channel.

In embodiments, the incumbent traffic is first incumbent traffic. The wireless transceiver detects second incumbent traffic in the second communication channel. In response to detecting the second incumbent traffic in the second communication channel, the wireless transmission to the wireless device is switched to a third communication channel of the 6 Ghz band.

In embodiments, the wireless transmission to the wireless device in the first communication channel is performed using a first bandwidth. The incumbent traffic is first incumbent traffic. The wireless transceiver detects second incumbent traffic in the second communication channel. In response to detecting the second incumbent traffic in the second communication channel, the wireless transmission to the wireless device is performed in the second communication channel using a second bandwidth less than the first bandwidth.

In embodiments, the detecting of the incumbent traffic in the first communication channel is performed in response to booting the wireless transceiver.

The advantages and benefits of the methods, systems, and apparatuses disclosed herein include enabling a Wi-Fi 6E system to transmit a CSA to enhance the Wi-Fi performance. The disclosed systems preclude bandwidth reduction and interrupted transmission, which can occur using traditional methods. The disclosed methods for operating wireless telecommunication equipment enables many users to use the same radio bands without pre-coordination. In addition, the advantages of the convolutional neural network (CNN) used for ML in the disclosed embodiments include the obviation of feature extraction and the use of shared weight in convolutional layers, which means that the same filter (weights bank) is used for each node in the layer; this both reduces memory footprint and improves performance.

FIG. 1a is a drawing illustrating an example system flow for Wi-Fi 6E, in accordance with one or more embodiments. The system is implemented using the components of the example network access device 302 and example computer system 600 illustrated and described in more detail with reference to FIGS. 3 and 6. An example wireless network 400 to implement the system flow of FIG. 1a is illustrated and described in more detail with reference to FIG. 4. Likewise, embodiments of the system can include different and/or additional components or can be connected in different ways.

FIG. 1a illustrates access point 104, summer 112 (sometimes referred to as a mixer), AWGN source 124, and wireless transceiver 120. Access point 104 is a wireless networking hardware device that allows other Wi-Fi devices to connect to a wired network. Summer 112 is an electrical circuit that creates new output signal 116 from signals 108, 128 applied to it. Signal 108 is a wireless signal in a first communication channel of a 6 Gigahertz (Ghz) band. For example, the 6 Ghz band used can be in accordance with IEEE 802.11ax (Wi-Fi 6E), which is an IEEE standard for wireless local area networks (WLANs) and the successor of 802.11ac. Wi-Fi 6E is also known as High Efficiency Wi-Fi, for the overall improvements to Wi-Fi 6 clients under dense environments. Wi-Fi 6E is designed to operate in license-exempt bands between 1 and 7.125 GHZ, including the 2.4 and 5 GHz bands already in common use, as well as the much wider 6 GHz band (5.925-7.125 GHz in the US).

The 802.11 standard provides several distinct radio frequency bands for use in Wi-Fi communications: 900 MHZ, 2.4 GHz, 3.6 GHz, 4.9 GHZ, 5 GHZ, 5.9 GHZ, 6 GHZ and 60 GHz. Each range is divided into a multitude of channels. In the standards, channels are numbered at 5 MHz spacing within a band (except in the 60 GHz band, where they are 2.16 GHz apart), and the number linearly relates to the center frequency of the channel. The 802.11ax standard also defines channel allocations for the 6 GHz band. This allocation determines the center frequencies for the 20 MHZ, 40 MHZ, 80 MHz and 160 MHz channels. The channels begin at 5950 MHZ (allowing 25 MHz of guard band between the first 6 GHZ channels and the upper range of the U-NII 4 band). 160 MHz is a bandwidth supported in the IEEE 802.11ac/ax/be specifications. A channel is typically assigned at 6.135 MHz (center Frequency of operation).

Signal 128 is an AWGN signal introduced into the first communication channel of the 6 Ghz band in use to indicate the presence of incumbent traffic, e.g., signal 108. AWGN is a noise model used in information theory to mimic the effect of many random processes that occur in nature. Incumbent device signals are thus simulated by, e.g., 10-MHz-wide AWGN signal 128. In terms of energy, this resembles other signals with which wireless transceiver 120 should not interfere. Wireless transceiver 120 may occupy a wider spectrum than the 10 MHz simulated signal. Hence, the embodiments disclosed herein address scenarios where device transmission overlaps the spectrum used by the incumbent signal. Signal 128 is detectable with at least 90% probability where wireless transceiver 120 has a signal strength of −62 dBm or greater. Signal 128 is additive because it is added to signal 108. The term "white" refers to the uniform power of signal 128 across the frequency band for the system. Signal 128 is Gaussian because it has a normal distribution in the time domain with an average time domain value of zero.

Incumbent traffic on a channel in the 6 Ghz band can be generated by fixed microwave links, e.g., the nearly 50,000 registered 6 GHz microwave links in the US. Most links are in the UNII-5 band, followed by UNII-7. These links are used for private and common carrier purposes, such as control and management of public utilities, public safety uses (backhaul for emergency and police dispatch), backhaul for cell towers, long distance telephone links, and many more. Incumbent traffic on a channel in the 6 Ghz band can include satellite services, e.g., allowed across UNII-5 through UNII-8, except the upper 150 MHz of UNII-8. Common uses include TV and Radio uplink for distribution and backhaul for voice and data communications.

Incumbent traffic on a channel in the 6 Ghz band can include television and broadcast services, e.g., usage in UNII-6 and UNII-8. This includes a wide range of uses related to transmission and relay of video signals, and electronic news gathering (e.g., local news TV trucks) for broadcast and cable TV entities. Other uses include special large scale audio usage by broadcast entities, venue and sound production companies. Incumbent traffic on a channel in the 6 Ghz band can include existing unlicensed use, e.g., Ultra-Wide Band across UNII-5, 6, 7, and 8.

Wireless transceiver 120 is an electronic device (e.g., a router, an access point) that can both transmit and receive wireless signals, e.g., using an antenna. Wireless transceiver 120 is implemented using components of example network access device 302 illustrated and described in more detail with reference to FIG. 3. To protect the incumbent traffic from interference by wireless transceiver 120, a contention-based protocol is used. A contention-based protocol (CBP) is a communications protocol for operating wireless telecommunication equipment that allows many users to use the same radio channel or band without pre-coordination. For example, the CBP allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel.

In embodiments, wireless transceiver 120 transmits wireless transmission (Wi-Fi signals) to a wireless device (e.g., cellphone, smartphone, tablet, smartwatch, laptop) in a first communication channel of the 6 Ghz band. Wireless transceiver 120 receives radio signal 116 in the first communication channel from wireless access point 104. Wireless transceiver 120 continually monitors radio signal 116 for incumbent traffic in the 6 Ghz band. Wireless transceiver 120 detects the incumbent traffic in the first communication channel. In embodiments, in response to detecting the incumbent traffic in the first communication channel, wireless transceiver 120 stops the wireless transmission to the wireless device in the first communication channel in accordance with the CBP. In embodiments, the wireless transmission to the wireless device in the first communication channel is performed using a first bandwidth, e.g., 160 MHz. In response to detecting the incumbent traffic in the first communication channel, the wireless transmission to the wireless device in the first communication channel is performed by wireless transceiver 120 using a second bandwidth (e.g., 80 MHz, 40 MHZ, 20 MHZ) that is less than the first bandwidth. Thus, interference between the wireless transmission and the incumbent traffic (signal 108) is prevented or mitigated.

Figure 1B:
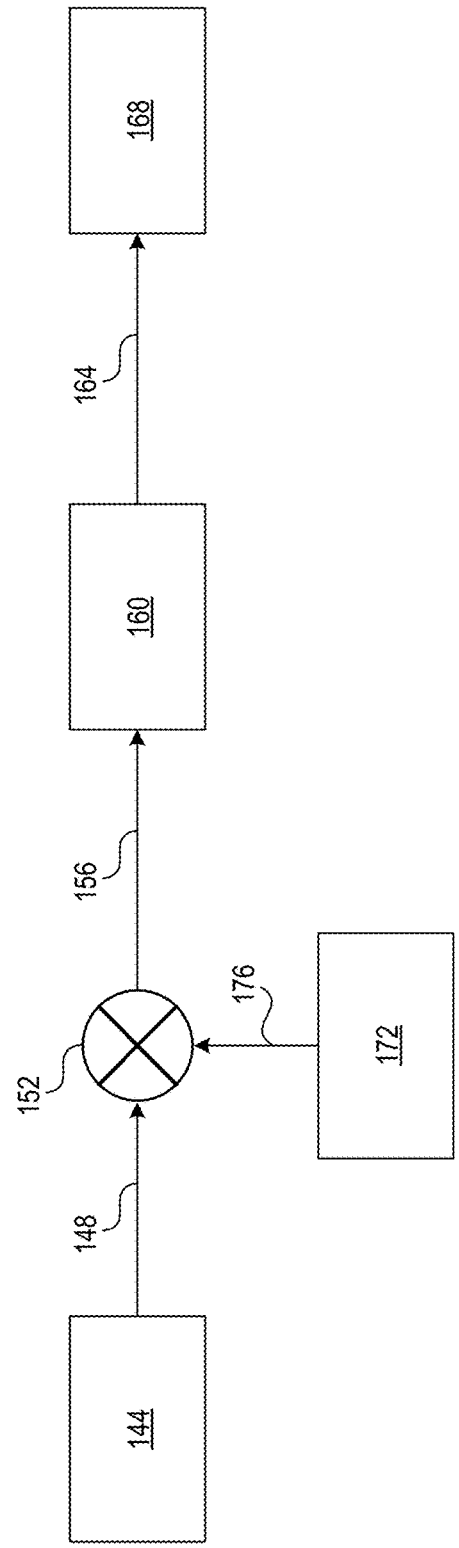
FIG. 1b is a drawing illustrating an example system flow for Wi-Fi 6E enhancement in contention-based protocol, in accordance with one or more embodiments.

FIG. 1b is a drawing illustrating an example system flow for Wi-Fi 6E enhancement in CBP, in accordance with one or more embodiments. The system is implemented using the components of the example network access device 302 and example computer system 600 illustrated and described in more detail with reference to FIGS. 3 and 6. An example wireless network 400 to implement the system flow of FIG. 1a is illustrated and described in more detail with reference to FIG. 4. Likewise, embodiments of the system can include different and/or additional components or can be connected in different ways.

FIG. 1b illustrates access point 144, summer 152 (sometimes referred to as a mixer), AWGN source 172, wireless transceiver 160, and wireless device 168. Access point 144 is the same as or similar to access point 104 illustrated and described in more detail with reference to FIG. 1a. Summer 152 is the same as or similar to summer 112 illustrated and described in more detail with reference to FIG. 1a. AWGN source 172 is the same as or similar to AWGN source 112 illustrated and described in more detail with reference to FIG. 1a. The AWGN signal is an emulation of a 6 Ghz incumbent. Wireless transceiver 160 is the same as or similar to wireless transceiver 120 illustrated and described in more detail with reference to FIG. 1a.

Wireless transceiver 160 transmits wireless transmission (Wi-Fi signals) to wireless device 168 (e.g., smartphone, smartwatch, IoT device, laptop, tablet) in a first communication channel of the 6 Ghz band. Wireless transceiver 160 receives radio signal 156 in the first communication channel from wireless access point 144. Wireless transceiver 160 continually monitors radio signals 156 for incumbent traffic (signal 148) in the 6 Ghz band. Wireless transceiver 160 detects the incumbent traffic in the first communication channel. In embodiments, detecting the incumbent traffic (signal 148) in the first communication channel comprises determining the presence of AWGN signal 176 in the first communication channel.

In embodiments, detection of the incumbent traffic in the first communication channel is performed in response to booting the wireless transceiver 160. Booting of the device 302 is described in more detail with reference to FIG. 3. For example, wireless transceiver 160 can perform channel selection while booting up and also at periodic intervals during operation. Wireless transceiver 160 can monitor channels and select one that reduces interference. For example, channels with non-Wi-Fi utilization greater than 40% are discarded. A second communication channel is selected that has lower channel utilization. Channels with higher utilization are avoided if possible. In an example, bandwidth is reduced from 160 MHz to 80 MHz to 40 MHz to 20 MHz if the interference is not on the Primary Beacon Channel, and depending on how wide the interference is (e.g., in 40/80/160/320 MHz operation).

In embodiments, the wireless transmission to the wireless device 168 in the first communication channel is performed using a first bandwidth, e.g., 160 MHz. To protect the incumbent traffic from interference, in response to detecting the incumbent traffic in the first communication channel, the wireless transmission to the wireless device 168 is performed in the first communication channel using a second bandwidth (e.g., 80 MHZ, 40 MHZ, 20 MHz) less than the first bandwidth. In embodiments, in response to detecting the incumbent traffic in the first communication channel, wireless transceiver 160 stops the wireless transmission to the wireless device 168 in the first communication channel in accordance with the CBP. In embodiments, wireless transceiver 160 transmits a CSA in the first and/or the second communication channel of the 6 Ghz band.

In accordance with Wi-Fi regulations and standards, the wireless transmission is stopped within 2-10 milliseconds (ms). In some examples therefore, transmitting the CSA is not performed in the first communication channel of the 6 Ghz band. In some examples, the 6 Ghz band uses reduced neighbor reporting (RNR). Information describing the second communication channel of the 6 Ghz band is sent using the 2.4 Ghz and/or the 5 Ghz band. In particular, the IEEE 802.11ax standard defines multiple types of signals that confirm operation of an access point (AP) on a particular channel. The multiple types of signals include beacon frames, which are broadcast signals sent by an AP on the channel of operation. The beacon frames include various capabilities and parameters of the AP. The multiple types of signals include probe response frames, which are broadcast signals that are usually (but not always) sent in response to a probe request from a client. The probe response frames are sent by the AP on the channel of operation, with similar content as a beacon frame. The multiple types of signals include fast initial link setup (FILS) discovery frames, which are short broadcast signals sent by certain types of APs on the channel of operation in between consecutive beacon frames to assist in fast passive discovery. The FILS discovery frames include basic information on the AP such as its basic service set identifier (BSSID), service set identifier (SSID), and time of the next beacon frame. The multiple types of signals include a reduced neighbor report (RNR) element, which is included (typically) in beacon and probe response frames. The RNR element is sent by multi-band (sometimes referred to as "co-located") APs in other bands (e.g., 2.4 Ghz or 5 Ghz channels) to assist fast out-of-band discovery. The RNR element includes basic information on the AP such as its BSSID, SSID and its operating channel in the 6 Ghz band.

The CSA provides a mechanism for wireless transceiver 160 to notify stations connected to it (e.g., device 168) of its intention to change channels. The CSA mechanism enables the wireless local area network WLAN to select a channel that is less noisy and less likely to cause interference (with signal 148). When wireless transceiver 160 switches wireless transmission to a different channel, wireless device 168 could "time out" while waiting to receive a new beacon from wireless transceiver 160. In such a scenario, wireless device 168 would have to begin scanning to discover the new channel on which wireless transceiver 160 is operating. If the disruption is long enough, wireless device 168 would need to reassociate, reauthenticate, and request an Internet Protocol (IP) address.

To address such disruptions, the CSA enables wireless transceiver 160 to announce that it is switching to a second channel before it begins transmitting on the second channel. Thus, wireless device 168 can transition to the second communication channel with minimal downtime. For example, when wireless transceiver 160 changes channels, wireless transceiver 160 advertises certain information in Element ID=37 to indicate which channel it is going to and when. This information assists wireless device 168 to jump to the same channel and saves scanning time.

In embodiments, wireless transceiver 160 transmits duplicate beacons in the first and/or the second communication channel of the 6 Ghz band. For example, when CSA is enabled, wireless transceiver 160 does not change to the second communication channel at once. Instead, wireless transceiver 160 sends a number of beacons (e.g., four beacons) that contain the CSA announcement before wireless transceiver 160 switches to the second communication channel. The number of beacons transmitted by wireless transceiver 160 can be configured before the channel change. A beacon frame is one of the management frames in IEEE 802.11-based WLANs. A beacon includes information about the network. Beacon frames are transmitted periodically and announce the presence of a wireless LAN and to synchronize the members of the service set. Beacon frames are transmitted by wireless transceiver 160. In an example, a beacon is transmitted in the 20 MHz frequency range. When the 40/80/160/320 MHz. frequency range is used, beacons can be duplicated multiple times, e.g., 2×/4×/8×/16×.

In embodiments, wireless transceiver 160 transmits CSA information in the first and/or the second communication channel of the 6 Ghz band. A CSA element is used by an AP in a BSS, a station (STA) in an Independent Basic Service Set (IBSS), or a mesh STA in a mess basic service set (MBSS) to advertise when it is changing to a new channel and the channel number of the new channel. A CSA element can include a channel switch mode, which indicates any restrictions on transmission until a channel switch. An AP in a BSS or a STA in an IBSS sets the Channel Switch Mode field to either 0 or 1 on transmission. In an MBSS, the Channel Switch Mode Field is reserved.

A CSA element can include a New Channel Number, which is set to the number of the channel to which the STA is moving. A CSA element can include a Channel Switch Count. For non-mesh STAs, this field either is set to the number of Target Beacon Transmission Times (TBTTs) until the STA sending the Channel Switch Announcement element switches to the new channel or is set to 0. A value of 1 indicates that the switch occurs immediately before the next TBTT. A value of 0 indicates that the switch occurs at any time after the frame containing the element is transmitted. This Channel Switch Announcement element is present in beacons and probe responses. The CSA element is also associated with an action frame (spectrum management type or category type=0) that can be sent by the AP between beacons to announce the channel switch. For example, the CSA information is an Information Element (IE) in the beacon. Wireless transceiver 160 can transmit a CSA for five beacons before making the switch to the second communication channel, in effect telling the device 168, "My new channel will be X." This keeps the device 168 aware of which channel it needs to switch to.

In response to transmitting at least one of the CSA, the duplicate beacons, or the CSA information, wireless transceiver 160 switches the wireless transmission to wireless device 168 to the second communication channel. In embodiments, the wireless transmission to the wireless device 168 in the first communication channel was performed using a particular bandwidth, e.g., 160 MHz. The wireless transmission to the wireless device 168 in the second communication channel is performed using the particular bandwidth, such that there is no degradation in wireless connectivity or speed.

In embodiments, the incumbent traffic detected is first incumbent traffic (e.g., from a first incumbent source). Example incumbent sources are described in more detail with reference to FIG. 1*a*. Wireless transceiver 160 detects second incumbent traffic in the second communication channel. In response to detecting the second incumbent traffic in the second communication channel, the wireless transmission to the wireless device 168 is switched to a third communication channel of the 6 Ghz band. In embodiments, the wireless transmission to the wireless device 168 in the first communication channel was performed using a first bandwidth, e.g., 160 MHZ, and the incumbent traffic detected is first incumbent traffic. Wireless transceiver 160 detects second incumbent traffic in the second communication channel. In response to detecting the second incumbent traffic in the second communication channel, the wireless transmission to the wireless device 168 is performed in the second communication channel using a second bandwidth (e.g., 80 MHZ, 40 MHZ) less than the first bandwidth.

In embodiments, wireless transceiver 160 determines absence of the incumbent traffic in the first communication channel. In response to determining the absence of the incumbent traffic, wireless transceiver 160 switches the wireless transmission to the wireless device 168 back to the first communication channel.

Figure 2:
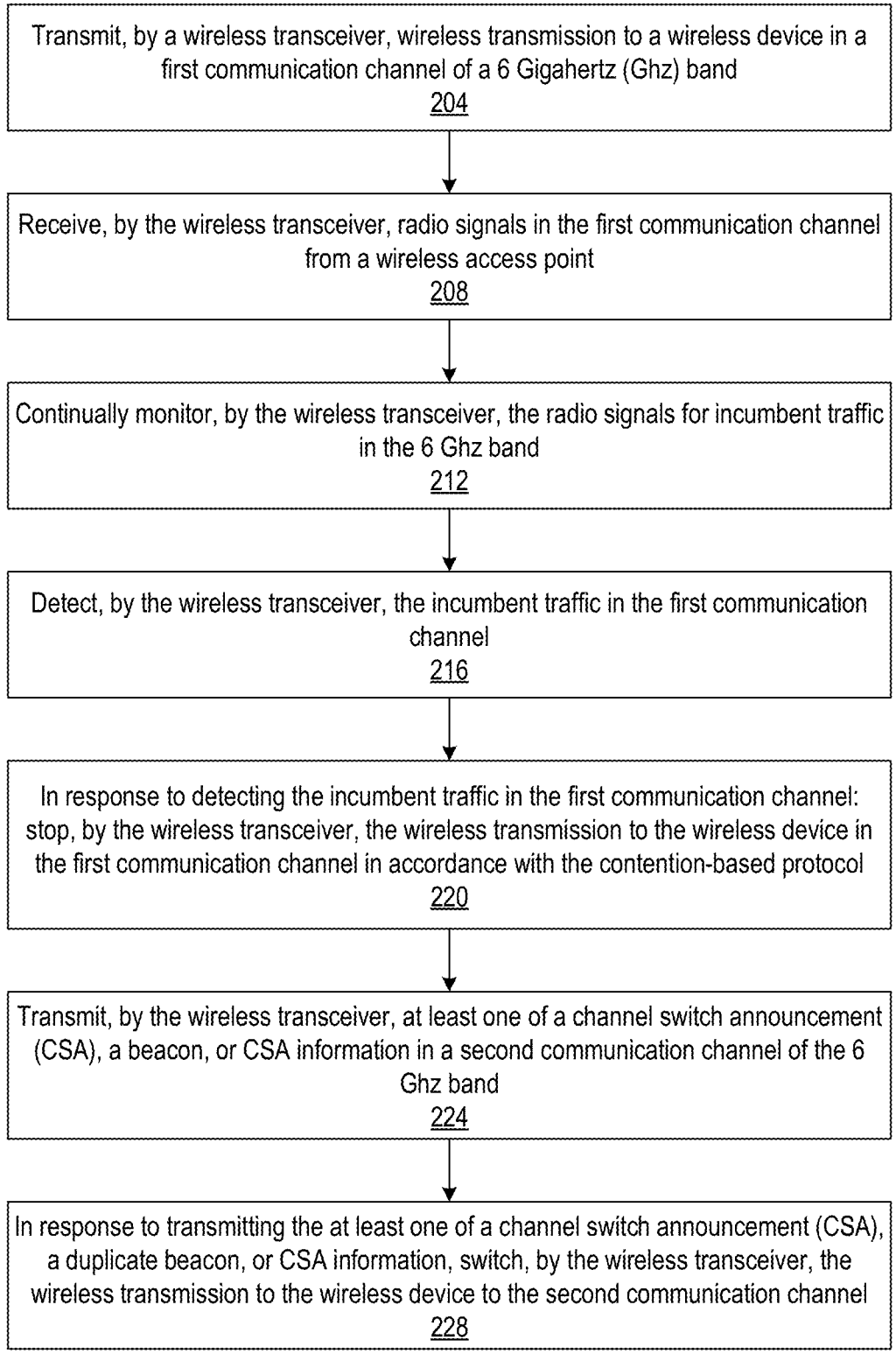
FIG. 2 is a flow diagram illustrating an example process for Wi-Fi 6E enhancement in contention-based protocol.

FIG. 2 is a flow diagram illustrating an example process for Wi-Fi 6E enhancement in contention-based protocol. In some embodiments, the process of FIG. 2 is performed by wireless transceiver 160. Wireless transceiver 160 is illustrated and described in more detail with reference to FIG. 1*b*. In other embodiments, the process of FIG. 2 is performed by a computer system, e.g., the example computer system 600 illustrated and described in more detail with reference to FIG. 6. Likewise, embodiments can include different and/or additional steps or can perform the steps in different orders.

In step 204, wireless transceiver 160 transmits wireless transmission to wireless device 168 in a first communication channel of a 6 Ghz band. Wireless device 168 is illustrated and described in more detail with reference to FIG. 1*b*. Wireless transceiver 160 is an electronic device (e.g., a router, an access point) that can both transmit and receive wireless signals, e.g., using an antenna. Wireless transceiver 160 is implemented using components of example network access device 302 illustrated and described in more detail with reference to FIG. 3. To protect the incumbent traffic from interference by wireless transceiver 160, a contention-based protocol is used. A CBP is a communications protocol for operating wireless telecommunication equipment that allows many users to use the same radio channel or band without pre-coordination. For example, the CBP allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel.

In step 208, wireless transceiver 160 receives radio signal 156 in the first communication channel from wireless access point 144. Radio signal 156 and wireless access point 144 are illustrated and described in more detail with reference to FIG. 1b. Access point 144 is a wireless networking hardware device that allows other Wi-Fi devices to connect to a wired network.

In step 212, wireless transceiver 160 continually monitors the radio signal 156 for incumbent traffic in the 6 Ghz band. For example, the 6 Ghz band used can be in accordance with IEEE 802.11ax (Wi-Fi 6E), which is an IEEE standard for WLANs and the successor of 802.11ac. Wi-Fi 6E is also known as High Efficiency Wi-Fi, for the overall improvements to Wi-Fi 6 clients under dense environments. Wi-Fi 6E is designed to operate in license-exempt bands between 1 and 7.125 Ghz, including the 2.4 and 5 Ghz bands already in common use as well as the much wider 6 Ghz band (5.925-7.125 Ghz in the US).

In step 216, the wireless transceiver detects the incumbent traffic in the first communication channel. In embodiments, detecting the incumbent traffic (signal 148) in the first communication channel comprises determining presence of AWGN signal 176 in the first communication channel. Signal 148 and AWGN signal 176 are illustrated and described in more detail with reference to FIG. 1b. In embodiments, detecting of the incumbent traffic in the first communication channel is performed in response to booting the wireless transceiver 160. Booting of the device 302 is described in more detail with reference to FIG. 3. For example, wireless transceiver 160 can perform channel selection while booting up and also at periodic intervals during operation. Wireless transceiver 160 can monitor channels and select one that reduces interference. For example, channels with non-Wi-Fi utilization greater than 40% are discarded. A second communication channel is selected that has lower channel utilization. Channels with higher utilization are avoided if possible.

In step 220, in response to detecting the incumbent traffic in the first communication channel, the wireless transceiver stops the wireless transmission to the wireless device in the first communication channel in accordance with the CBP.

In step 224, the wireless transceiver transmits at least one of a CSA, a duplicate beacon, or CSA information in a second communication channel of the 6 Ghz band. The CSA provides a mechanism for wireless transceiver 160 to notify stations connected to it (e.g., device 168) of its intention to change channels. The CSA mechanism enables the wireless local area network WLAN to select a channel that is less noisy and less likely to cause interference (with signal 148). When wireless transceiver 160 switches wireless transmission to a different channel, wireless device 168 could "time out" while waiting to receive a new beacon from wireless transceiver 160. In such a scenario, wireless device 168 would have to begin scanning to discover the new channel on which wireless transceiver 160 is operating. If the disruption is long enough, wireless device 168 would need to reassociate, reauthenticate, and request an IP address.

To address such disruptions, the CSA enables wireless transceiver 120 to announce that it is switching to a second channel before it begins transmitting on the second channel. Thus, wireless device 168 can transition to the second communication channel with minimal downtime. For example, when wireless transceiver 160 changes channels, wireless transceiver 160 advertises certain information in Element ID=37 to indicate which channel it is going to and when. This information assists wireless device 168 to jump to the same channel and saves scanning time.

In step 228, in response to transmitting the at least one of a CSA, a duplicate beacon, or CSA information, the wireless transceiver switches the wireless transmission to the wireless device to the second communication channel. In embodiments, wireless transceiver 160 transmits duplicate beacons in the first and/or the second communication channel of the 6 Ghz band. For example, when CSA is enabled, wireless transceiver 160 does not change to the second communication channel at once. Instead, wireless transceiver 160 sends a number of beacons (e.g., four beacons) that contain the CSA announcement before wireless transceiver 120 switches to the second communication channel. The number of beacons transmitted by wireless transceiver 160 can be configured before the channel change. A beacon frame is one of the management frames in IEEE 802.11-based WLANs. A beacon includes information about the network. Beacon frames are transmitted periodically and announce the presence of a wireless LAN and to synchronize the members of the service set. Beacon frames are transmitted by wireless transceiver 160.

Figure 3:
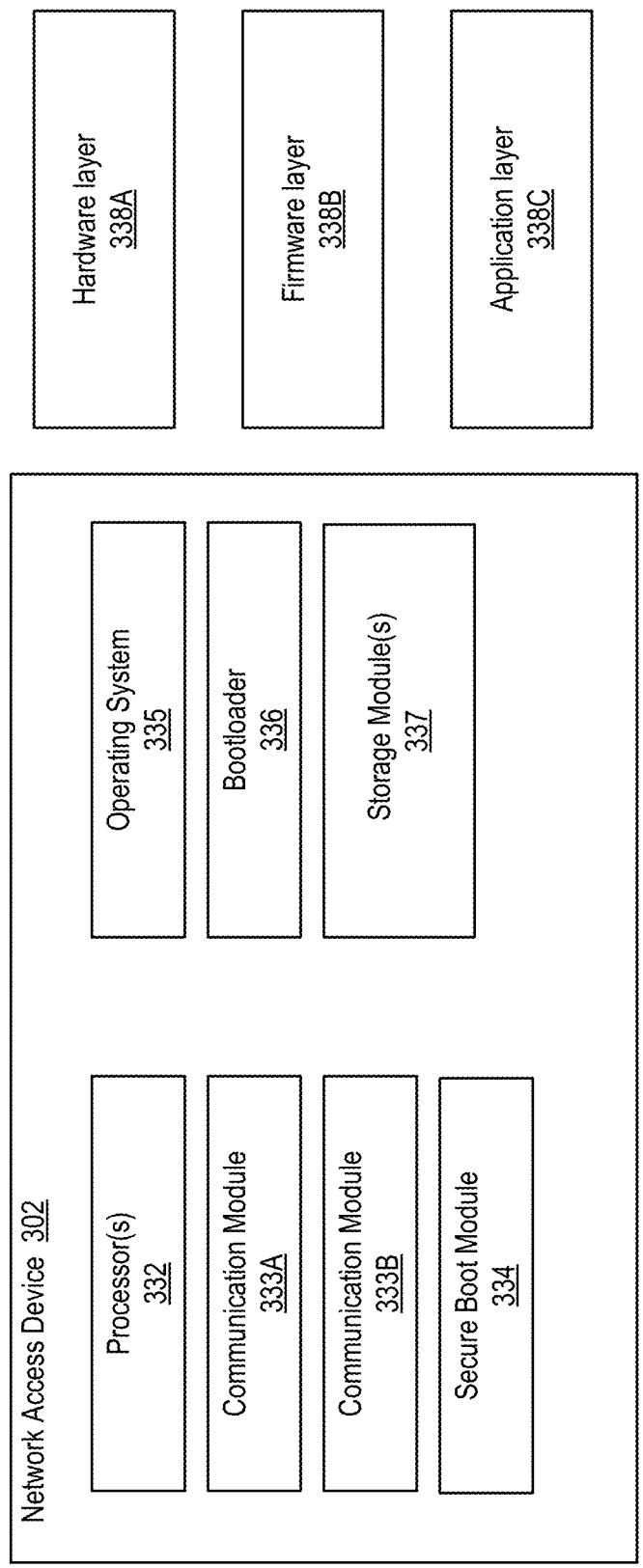
FIG. 3 is a block diagram illustrating an example network access device in accordance with one or more embodiments.

FIG. 3 is a block diagram illustrating an example network access device 302 in accordance with one or more embodiments. In embodiments, the network access device 302 facilitates connections between electronic devices (e.g., personal computers, mobile phones, wearable items) and a network. The network access device 302 may be, for example, a router, modem, switch, AP, etc. Some embodiments are described in the context of a router for purpose of illustration only. Those skilled in the art will recognize that similar technology may be used in conjunction with other types of network access devices. Network access device 302 may be, for example, access point 144 of FIG. 1B. Network access device 302 is implemented using the components of the example computer system 600 illustrated and described in more detail with reference to FIG. 6. Likewise, embodiments of network access device 302 can include different and/or additional components or can be connected in different ways.

Network access device 302 can include one or more processors 332, communication module(s) 333A-B, a secure boot module 334, an operating system 335, a bootloader 336, and one or more storage modules 337.

Processor(s) 332 can execute instructions stored in the storage module(s) 337, which can be any device or mechanism capable of storing information. In some embodiments a single storage module includes multiple computer programs for performing different operations (e.g., establishing a communication channel with an electronic device, examining data packets within received traffic, etc.), while in other embodiments each computer program is hosted within a separate storage module.

In some embodiments, the network access device 302 may include at least three layers: a hardware layer 338A, a firmware layer 338B, and an application layer 338C. The hardware layer 338A of a network access device 302 may include the physical chipset-level of the network access device. A boot certificate (also referred to as a "birth certificate") may be "sewn" or "burned" into the hardware layer 338A of the network access device 302. For example, the boot certificate may be burned in a chipset-level location within the hardware layer 338A of the network access device. The boot certificate may include registration information that can be embedded within a secure, chipset-level location known only to the manufacturer.

The boot certificate may include information indicative of identifying the network access device 302. The boot certificate may include a serial number, license key, or other identifying information to identify the network access device 302. The boot certificate may verify physical ownership of the network access device 302, as the boot certificate may be physically stored on the hardware layer 338A of the network access device 302.

The hardware layer 338A of the network access device 302 may include a hash key programmed in one-time programmable (OTP) memory. OTP memory may include non-volatile memory that permits data to be written to memory only once. OTP memory may be utilized during manufacturing of the network access device 302 to upload firmware onto the network access device 302. In some embodiments, if the network access device 302 receives firmware, the OTP memory can upload the firmware to the network access device 302. The OTP memory may include the boot certificate. When the network access device 302 leaves a manufacturing facility, the network access device 302 may include a birth certificate and firmware signed with an intermediate digital certificate.

The network access device 302 may include a firmware layer 338B. The firmware layer 338B may require that any firmware installed onto the network access device 302 be digitally signed to prevent any unauthorized entity from accessing and/or installing firmware onto the network access device.

In some embodiments, the network-accessible server system may periodically transmit updated firmware to the network access device 302. Each time updated firmware is transmitted from the network-accessible server system, the network-accessible server system may digitally sign the updated firmware.

The network access device 302 may include an application layer 338C. The application layer 338C may facilitate interaction with a mobile application to modify the settings of the network access device 302. The application layer 338C may include applications that can be read by, for example, a secure boot module 334. These applications can be developed by the manufacturer or a third party. While a mobile application may connect to the application layer 338C of the network access device 302, the application layer may be prevented from being activated until after the network access device 302 verifies that the application has been signed by the manufacturer. The application layer 338C may not connect to the mobile application until a digital certificate is distributed to the network access device 302.

The network access device 302 may include one or more communication modules 333A-B. Here, for example, the network access device 302 includes multiple communication modules 333A, 333B, which may be designed to communicate in accordance with different communication protocols. However, the network access device 302 could include a single communication module capable of communicating in accordance with multiple communication protocols or communicating along separate threads and/or frequency bands in accordance with a single communication protocol. The communication module(s) 333A-B can facilitate communication between various components of the network access device 302. Generally, the communication module(s) 333A-B communicate with other electronic device(s) by transmitting data wirelessly via an antenna. In some embodiments, the network access device 302 includes multiple antennas designed for communicating in accordance with various communication protocols described herein.

A first communication module 333A may route and/or forward network traffic between one or more electronic devices and a network, such as the Internet. For example, the communication module 333A may facilitate electronic communication with a mobile phone, tablet computer, or wearable item seeking to establish a connection with a network to which the network access device 302 is connected.

A second communication module 333B may route and/or forward local data packets between a computer program executing on an electronic device and a manufacturer platform executing on a network-accessible server system. The local data packets received at the network access device 302 may include provisioning and settings customization of the network access device 302. In some embodiments, the second communication module 333B may utilize a short-range wireless communication protocol to communicate with the computer program.

The secure boot module 334 can be configured to, upon startup, verify that firmware residing on the network access device 302 has been digitally signed. For example, the secure boot module 334 may examine the signature of the bootloader 336 to verify that it hasn't been modified. If the bootloader 336 is fully intact, the secure boot module 334 may permit the bootloader 336 to initiate the operating system 335.

Upon initialization of an acquired device (e.g., a network access device), the network access device may be onboarded onto a network. A manufacturer-authorized device may onboard and provision the network access device. An example of a manufacturer-authorized device is a computing device that is authorized by the manufacturer to securely provision and boot a device, such as a network-accessible server system. A network access device, such as a router, may initially connect to the manufacturer-authorized device during the start-up or initialization process (e.g., upon booting). When the network access device connects to the manufacturer-authorized device, the manufacturer-authorized device may authenticate the network access device. Authenticating the network access device may include inspecting the network access device to verify the identity of the network access device.

Generally, network access devices, during initialization, may be vulnerable to unauthorized access. A remote entity may attempt to access the network access device or transmit malware to the network access device upon boot. To address such vulnerabilities, network access devices may include authorization by a manufacturer-authorized device before the network access device is permitted to connect to a network.

Additionally, in many areas where a network access device is provisioned, there may be insufficient coverage to allow for the electronic device to communicate with a cellular node over a wireless cellular network. If the electronic device is unable to connect to a wireless cellular network and transmit a request to the manufacturer-authorized device, the secure boot process initiated by the network access device may be unsuccessful.

To address the inconsistent coverage of an electronic device to connect to a wireless network, a network-accessible server system may establish a geographical location of the network access device and a geographical location of an electronic device and determine that the geographical location of the network access device and the geographical location of the electronic device are within a predetermined proximity of one another. In some embodiments, establishing the geographical location of the electronic device includes examining an IP address of the network access device. In other embodiments, it is determined that the network access device and the electronic device are communicatively coupled via a short-range wireless communication protocol, such as Bluetooth®, for example. This allows the network-accessible server system to determine that the electronic device is within a certain proximity of the network access device due to the connectivity range limits on such a short-range wireless communication protocol.

Figure 4:
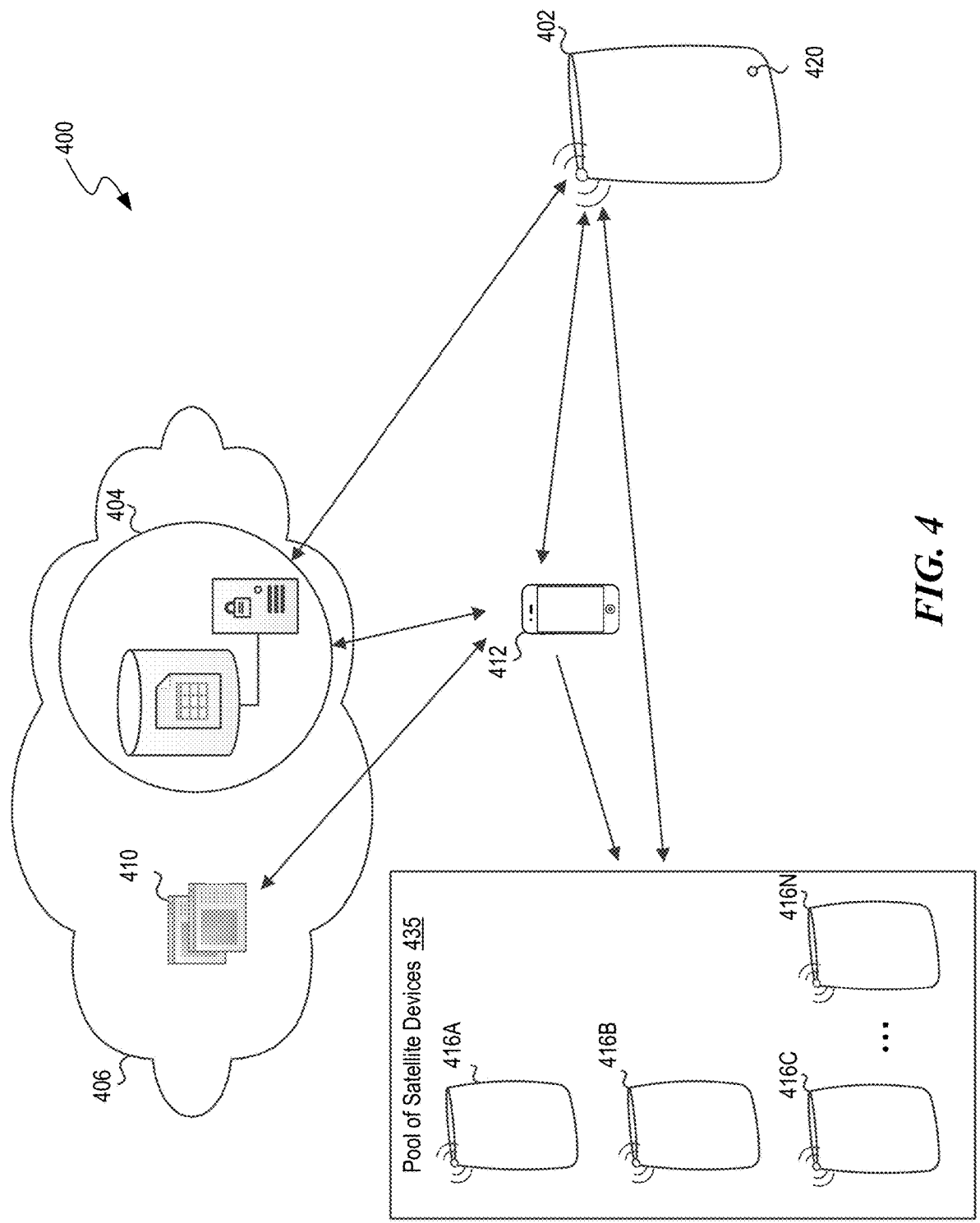
FIG. 4 is a drawing illustrating an example network environment, in accordance with one or more embodiments.

FIG. 4 is a drawing illustrating an example network environment 400, in accordance with one or more embodiments. The network environment 400 includes one or more satellite networking devices (or simply "satellite devices"), consistent with various embodiments. In accordance with embodiments herein, a satellite device is a network-enabled device that is configured to forward network data between the network access device and local electronic devices connected to the satellite device. In an embodiment, the satellite device may be configured to direct network data to the network access device, where the network access device transmits/receives network data from the network, such as the Internet. Typically, the satellite device is used to improve the existing abilities of the network access device by extending the range or improving the signal strength of a network and so on.

In an embodiment, the environment 400 may include a network access device 402, a computer program 410 executing on an electronic device 412, a network-accessible server system 404, and at least one satellite device (e.g., 416A-N from a pool of satellite devices 435). It should be appreciated that a typical networked environment (house, building) may have one or two satellite devices. However, an embodiment contemplates many satellite devices, such as N number of devices as depicted by Nth satellite device 416N. In an embodiment, network-accessible server system 404 includes a management platform (not shown), which is communicably connected to any of, all of, or any combination of: computer program 410, an application on network access device 402 (not shown), and an application on at least one satellite device 416A-N. Thus, any reference herein to network-accessible server system 404 may include the management platform.

In some embodiments, a satellite device, such as first satellite device 416A, may be configured to facilitate communication between electronic devices (e.g., personal computers, mobile phones, wearable items) and a network. For example, in an embodiment, first satellite device 416A is configured to communicate with computer program 410 on electronic device 412. First satellite device 416A may be configured and used to improve the existing abilities of the network access device 402 by extending the range or improving the signal strength of the network.

Any satellite device 416A-N may communicatively couple to the network access device 402, and the network access device 402 may direct network data transmitted by such satellite devices. Satellite device(s) 416A-N may communicate with the network access device 402 via a suitable wireless communication protocol as described herein. Also, in an embodiment, any satellite device in the pool of satellite devices 435 may communicatively couple to another and different satellite device in the pool satellite devices 435 for the purposes of communicating with the network access device 402. For example, first satellite device 416A and second satellite device 416B may be configured in a series topology, and so on. In this example, second satellite device 416B sends data that is intended for network access device 402 directly to first satellite device 416A, first, and first satellite device 416A forwards the data on to network access device 402.

The network access device 402 may connect to one or more satellite device(s) 416A-N. Each satellite device (e.g., first satellite device 416A) communicably connected to the network access device 402 may be identifiable by the network access device 402. The network access device 402 may receive identification information from the satellite device (e.g., first satellite device 416A) upon being communicably connected to the satellite device. Identification information may include a boot certificate of the satellite device (e.g., first satellite device 416A), where the boot certificate is stored in the satellite device, for example. Or, the identification may include permission to access the boot certificate related information in storage in the manufacturer's cloud system. Identification information may include a satellite device serial number or IP address, for example.

One or more satellite devices may connect to the network access device 402 via a tree network topology. In a tree topology, each satellite device is configured to transmit network data to each of the other satellite devices and to the network access device. The network access device 402 is configured to transmit the network data to the network. First satellite device 416A, second satellite device 416B, and third satellite device 416C are each communicably connected to network access device 402 via network 404D. In addition, first satellite device 416A is communicably connected to second satellite device 416B via wireless communication and to the third satellite device 416C via wireless communication. Second satellite device 416B also is communicably connected to third satellite device 416C via wireless communication. Network access device 402 may be configured to further transmit the network data to the network (not shown). Multiple satellite devices may be interconnected, where each satellite device forwards network data through the tree network to the network access device 402. Multiple satellite devices may be interconnected across a tree network environment, such as a building, for example. The tree network may allow for multiple satellite devices to be interconnected, where the range of the wireless network may be extended due to the interconnectivity of multiple satellite devices located across the network environment.

One or more satellite devices may connect to the network access device 402 via a hub-and-spoke or star topology. In a hub-and-spoke topology, each satellite device is configured to transmit network data to the network access device and the network access device is configured to transmit the network data to the network. First satellite device 416A is communicably connected to network access device 402 via a first wireless communication. Second satellite device 416B is communicably connected to network access device 402 via a second wireless communication. Third satellite device 416C is communicably connected to network access device 402 via a third wireless communication. Network access device 402 is configured to further transmit the network data to the network (not shown).

An electronic device 412 may communicatively couple to one or more satellite devices 416A-N. For example, the electronic device 412 may connect to the first satellite device 416A or the second satellite device 416B. In an embodiment, the electronic device may communicably connect to the satellite devices of the pool of satellite devices via a separate connection with each satellite device. For example, electronic device 412 may connect to the first satellite device 416A and connect to the second satellite device 416B via separate connections (not shown) over a network. The first satellite device 416A may receive network data from the electronic device 412 and direct the network data to the network access device 402. In a tree network architecture/topology, one satellite device may receive network data from another satellite device that was originally from an electronic device over a network and may forward the network data to the network access device. For instance, the first satellite device 416A may receive network data from second satellite device 416B, who originally received the network data from electronic device 412, and the first satellite device 416A may forward the network data to the network access device 402. In an embodiment, electronic device 412 may also communicably connect to the network-accessible server system 404 via the network. A network can represent communication using networking protocol or it can represent cellular protocols. Or, a network can represent communication using both types of protocols. One skilled in the art can understand which protocol is being used, depending on the context. Further, electronic device 412 and network access device 402 may be communicably connected via a network. In an embodiment, network-accessible server system 404 is communicably connected to network access device 402.

An embodiment of a high-level process for onboarding or booting a satellite device can be understood with reference to FIG. 4. It should be appreciated that the particulars are for illustrative purposes and are not meant to be limiting. For purposes of discussion, it is assumed that second satellite device 416B has not yet been provisioned, but a user desires to do so. Second satellite device 416B becomes alive, for example by the user turning on the device. It should further be appreciated that second satellite device 416B does not connect to any port of network access device 402 and, therefore, does not have or obtain Internet connectivity of its own.

Upon activation, second satellite device 416B electronically communicates with electronic device 420, which is within a predetermined range or proximity, by way of short-range wireless communication protocol, such as Bluetooth® Low Energy (BLE), for example. More specifically, second satellite device 416B is configured to communicate with computer program 410 and computer program 410 is also configured to receive and process communication from second satellite device 416B. In an embodiment, second satellite device 416B was previously provisioned, e.g., by the manufacturer, with a unique certificate. That is, a satellite boot certificate (also referred to as a satellite "birth certificate") may have been embedded, e.g., sewn or burned, into the hardware layer of second satellite device 416B. The satellite boot certificate may include registration information that can be embedded within a secure, chipset-level location known only to the manufacturer. Thus, in response to being activated, second satellite device 416B transmits its satellite boot certificate to computer program 422. The registration information of second satellite device 416B can be stored on any of the devices in the environment, such as network-accessible server system 404, electronic device 420, or network access device 402. It should be appreciated that upon activation, second satellite device 416B may also send signals to network access device 402, however, network access device 402 can be configured to ignore such signals until certain conditions are met as described below.

Upon receipt of the satellite boot certificate, computer program 410 transmits the satellite birth certificate and appropriate credentials of computer program 410 to network-accessible server system 404. In a different embodiment, upon a type of notification, computer program 410 transmits data, identifying that the user is in possession of second satellite device 416B, to network-accessible server system 404. For example, a user can take a photograph of the serial number of the second satellite device 416B and transmit the photograph along with the appropriate credentials of computer program 410 to network-accessible server system 404. In another embodiment, computer program 410 accesses a birth certificate of second satellite device 416B stored on electronic device 420 or network access device 402 and transmit the accessed birth certificate along with the appropriate credentials of computer program 410 to network-accessible server system 404.

Upon receipt of the satellite boot certificate or data indicating that the user is in possession of second satellite device 416B and the credentials of computer program 422, network-accessible server system 404 verifies, using the received credentials, that computer program 410 is a valid application in its system. Also, network-accessible server system 404 verifies that the satellite boot certificate, or data indicating that the user is in possession of second satellite device 416B, is legitimate. For instance, one or more verified satellite boot certificates may be listed on a satellite boot certificate registry on or associated with network-accessible server system 404. Network-accessible server system 404 compares the received satellite boot certificate to a satellite boot certificate stored in the satellite boot certificate registry. Upon a match, network-accessible server system 404 knows that the received satellite boot certificate is valid. As an example, and for illustrative purposes, a satellite boot certificate can contain or be associated with a serial number of second satellite device 416B. In another embodiment, network-accessible server system 404 compares the received data indicating the user is in possession of second satellite device 416B with previously stored data. Upon a match, network-accessible server system 404 knows that the received data indicating the user is in possession of second satellite device 416B is valid. Examples of credentials of computer program 410 may include, but are not limited to, username and password or any identifier agreed upon between computer program 410 and network-accessible server system 404. It should be appreciated that confirming that the user of the computer program 410 is valid, and that the user is in possession of the satellite device, may be performed in a particular sequence or in parallel.

Upon verifying that the user of computer program 410 is valid and that the satellite boot certificate or possession of second satellite device 416B is confirmed, network-accessible server system 404 associates second satellite device 416B with computer program 410 and/or network access device 402 for further communication.

In an embodiment, upon associating computer program 410 and second satellite device 416B, network-accessible server system 404 pushes a digital certificate intended for second satellite device 416B through or via network access device 402. In another embodiment, upon associating computer program 410 and second satellite device 416B, network-accessible server system 404 grants permission for second satellite device 416B to have access to network access device 402. For example, network-accessible server system 404 may send a notification to network access device 402 to accept any requests by second satellite device 416B for access to the network. In another embodiment, upon receiving a request from second satellite device 416B to access the network, network access device 402 may transmit a verification request to network-accessible server system 404 or to computer program 410 intended for network-accessible server system 404. Upon receiving such verification request, network-accessible server system 404 can check whether second satellite device 416B is an associated device. When second satellite device 416B is an associated device, network-accessible server system 404 can send a notification indicating that permission to access the network is granted. When second satellite device 416B is not an associated device, network-accessible server system 404 can send a notification indicating that permission to access the network is denied.

A specialized public key infrastructure (PKI) accessible to the network-accessible server system 404 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 404 will request a separate certificate for each mobile application and satellite device. For example, if the network access device is set up to be connected to a single mobile application and four satellite devices distributed throughout an environment (e.g., a home), then the network-accessible server system 204 may request five certificates and distribute a unique certificate to the mobile application and satellite devices.

Intermediate digital certificates may be distributed by one of the network-accessible server system 404. Intermediate digital certificates may be generated for firmware verification. The intermediate digital certificates may include information indicative of identifying the network-accessible server system 404. The network-accessible server system 404 may digitally sign the firmware by providing information identifying the network-accessible server system 404 on the intermediate digital certificate. The network access device may receive the intermediate digital certificate and determine that the firmware has been digitally signed and is verified.

Upon receiving the digital certificate, second satellite device 416B may have access to the Internet by using network access device 402. In an embodiment, if network access device 402 is not within communication range of second satellite device 416B, second satellite device 416B may communicate with network access device 402 by using a satellite device, for example as in a daisy chain configuration or tree configuration. For example, in a user's household, the user's router (user's network access device) may be physically in the basement floor and the user's satellite device is in the upstairs kitchen. Thus, as the user walks up the stairs from the basement to one of the upstairs rooms, the user's cell phone access to the Internet may switch from being communicably connected directly to the user's router to being communicably connected directly to the user's satellite device, which is communicably connected directly to the user's router. To continue with the example, as the user walks downstairs, the user's cell phone access to the Internet may switch again from being communicably connected directly to the user's satellite device to being communicably connected directly to the user's router.

An automatic firmware update process and system is provided according to one or more embodiments. Providing for automatic updates of firmware can help to ensure an improved secure networking environment. For instance, relying on a customer to update his or her satellite device might result in the customer's satellite device lacking a security upgrade. In this and similar scenarios, the satellite device might be vulnerable to a malware attack because the satellite device lacks an antidote to the malware that was made available in a later version of the firmware.

In an embodiment and any of the satellite devices 416A-N, network access device 402, network-accessible server system 404, and computer program 410 may be configured to determine whether any satellite device (e.g., second satellite device 416B) is configured with the most up-to-date or required firmware. It should be appreciated that while one satellite (e.g., second satellite device 416B) may be used as an example in the following discussion, it is for illustrative purposes and is not meant to be limiting. In the example, the satellite boot certificate or other metadata associated with the satellite boot certificate can indicate an initial firmware version, which can be used by any of the above-cited entities to determine whether the firmware presently loaded on second satellite device 416B matches the presently required firmware. For instance, a user could have purchased the satellite device months before installing the satellite device. It therefore, could be possible that a newer version of the firmware became available during the time after the purchase and before installation. Thus, in this example, at installation, the firmware associated with the satellite boot certificate is not up-to-date.

In an embodiment, network-accessible server system 404 pushes the required firmware intended for second satellite device 416B by using network access device 402. In an embodiment, the firmware that gets pushed onto any satellite device is digitally signed so that any configured entity can verify whether the firmware is valid and not malware imposing as legitimate firmware. In another embodiment, network access device 402 may have the required firmware itself and may push such required firmware intended for second satellite device 416B itself. The embodiments disclosed herein ensure that a secure configuration is deployed to second satellite device 416B, once second satellite device 416B has been brought online.

An embodiment for monitoring firmware updates includes a satellite device being configured to identify its current firmware status and to send such status to the network access device or to the network-accessible server system. In an embodiment, the network access device determines whether the firmware status is up-to-date and, when not, either pushes a firmware update in its storage to the satellite device or transmits a request to the network-accessible server system for the most up-to-date firmware for the satellite device. In an embodiment, the network-accessible server system determines whether the firmware status is up-to-date and, when not, pushes a firmware update in its storage to the satellite device.

In an embodiment for monitoring firmware updates in a tree network architecture of two or more satellite devices, a first satellite can ping the other satellites in the tree network for the purposes of receiving their respective firmware versions. The first satellite is configured to compare its firmware version with received firmware versions. If the first satellite device concludes that their respective firmware versions match, then the first satellite device is configured to conclude that no firmware update is required. The first satellite device may send an update notification intended for the network-accessible server system. The first satellite device may be further configured to conclude that its firmware version is different from any of the other received firmware versions. The first satellite device, upon detecting that its firmware version does not match all other firmware versions, may be configured to report to the network-accessible server system that there is a discrepancy in firmware versions. In an embodiment, the network-accessible server system pushes the latest firmware version to the first satellite device. In another embodiment, the first satellite device, upon detecting that its firmware version does not match all other firmware versions, may be configured to report to the network access device that there is a discrepancy in firmware versions. In an embodiment, the network access device pushes the latest firmware version to the first satellite device. In an embodiment, upon receiving a notification from the first satellite device that there is a discrepancy of firmware versions on the network, the network access device may transmit a firmware update request to the network-accessible server system for firmware updates for the first satellite device and, optionally, for the other satellite devices on the network.

In an embodiment for monitoring firmware updates, each of the satellite devices on the network can, upon request or periodically, transmit their respective firmware statuses to the network access device. The network access device is configured to decide whether any firmware upgrades are required for any of the satellite devices on the network. In an embodiment, when an upgrade is required, the network access device can make a request for such upgrade to the network-accessible server system for the upgrade. In an embodiment, the network-accessible server system can automatically push a firmware upgrade for any satellite device to the network access device. Network access device can be configured to, upon receipt of the automatically pushed firmware upgrade from the network-accessible server system, automatically decide which satellite needs the upgrade and automatically push such upgrade to the satellite device, It should be appreciated that network-accessible server system 404 may push other configurations intended for second satellite device 416B via network access device 402. For example, such configurations enable second satellite device 416B to be fully operative on network access device 402. As another example, using electronic device 420 and computer program 422, a user can configure second satellite device 416B by setting suitable parameters through a user interface on computer program 410 that connects with network-accessible server system 404. Then, network-accessible server system 404 pushes the entered configurations intended for second satellite device 416B via network access device 402.

Upon obtaining Internet connectivity, second satellite device 416B initiates self-registration in network-accessible server system 404. Such an arrangement allows network access device 402 and any number of satellites to be connected to network-accessible server system 404, as well as the computer program 422, regardless of whether electronic device 420 resides within the network associated with network access device 402. When electronic device 420 resides outside of such network, changes requested through computer program 410 can be carried out by network-accessible server system 404. In some embodiments, each of a plurality of satellites within the network is connected to network access device 402 in accordance with a hub-and-spoke approach (i.e., each satellite is connected directly to network access device 402). In other embodiments, the satellites within the network are permitted to form a tree network architecture. Thus, each satellite need not necessarily be directly connected to the network access device. For example, as shown in FIG. 7A, second satellite device 416B can be connected to first satellite device 740, which is connected to network access device 402.

By installing a separate digital certificate on each of network access device 402, computer program 422, and satellite device(s) (e.g., first satellite device 740 and second satellite device 416B), network-accessible server system 404 can ensure that these objects are tied together. Consequently, for an unauthorized entity to gain access to the network, the unauthorized entity would need to acquire the digital certificate in addition to the credentials (e.g., username and password) used to log into computer program 422.

As described above, a specialized PKI accessible to the network-accessible server system (e.g., network-accessible server system 404) can be configured to facilitate the distribution of digital certificates, each of which may include a public encryption key, to the network access device(s) (e.g., network access device 402), mobile application(s) (e.g., computer program 422), and satellite(s) (e.g., a first satellite device and second satellite device) associated with a network. The network-accessible server system may communicate with the PKI via application programming interfaces (APIs), bulk data interfaces, etc. Generally, the network-accessible server system will request a separate certificate for each mobile application and satellite. For example, if the network access device is set up to be connected to a single mobile application and four satellites distributed throughout an environment (e.g., a home), then the network-accessible server system may request five certificates and distribute a unique certificate to each of the mobile application and satellites.

Intermediate digital certificates may be distributed by one of the network-accessible server system 404 or the PKI module 434. Intermediate digital certificates may be generated for firmware verification. The intermediate digital certificates may include information indicative of identifying the network-accessible server system 404. The network-accessible server system 404 may digitally sign the firmware by providing information identifying the network-accessible server system 404 on the intermediate digital certificate. The network access device 402 may receive the intermediate digital certificate and determine that firmware has been digitally signed and is verified.

One benefit of the tree architecture described herein is that security risk can be lessened even when the network access device and the satellite(s) are produced by different entities. For example, an individual may have a router manufactured by Comcast® and an Orbi® Wi-Fi System manufactured by NETGEAR® deployed within her home. In such instances, the individual can log into a mobile application executing on her mobile phone, claim the network access device, and configure each satellite. In some embodiments, the network access device is configured to communicate with the satellite(s). For instance, in such embodiments, traffic received at either level (e.g., by the network access device or the satellite devices) can be examined for threats. In other embodiments, the satellite(s) operate independent from the network access device. In such embodiments, only traffic received by the satellite(s) may be examined for threats.

According to embodiments herein, each time a new electronic device (e.g., a new satellite device or a new mobile device) comes onto the network, the satellite device or the network access device to which the new electronic device connects can transmit a notification to the associated mobile application. The notification may prompt the user to specify whether network access should be permitted. While this type of multifactor approval process requires an express indication of approval from a network administrator (e.g., the user responsible for deploying the network access device and/or satellite(s)), it can significantly lessen the security risk of unauthorized access. Administrator authorization may be required even if the party attempting to access the network has acquired the necessary credentials (e.g., the password).

In some embodiments and as described above, each network access device and/or satellite within a network environment is configured to automatically update its firmware. Thus, in accordance with embodiments herein, when these objects are properly connected (e.g., via a tree architecture), the firmware across all of the devices will be consistent. Such action ensures that a hacker cannot gain unauthorized access via a security flaw in an older firmware version that has not yet been manually updated by the network administrator.

Figure 5:
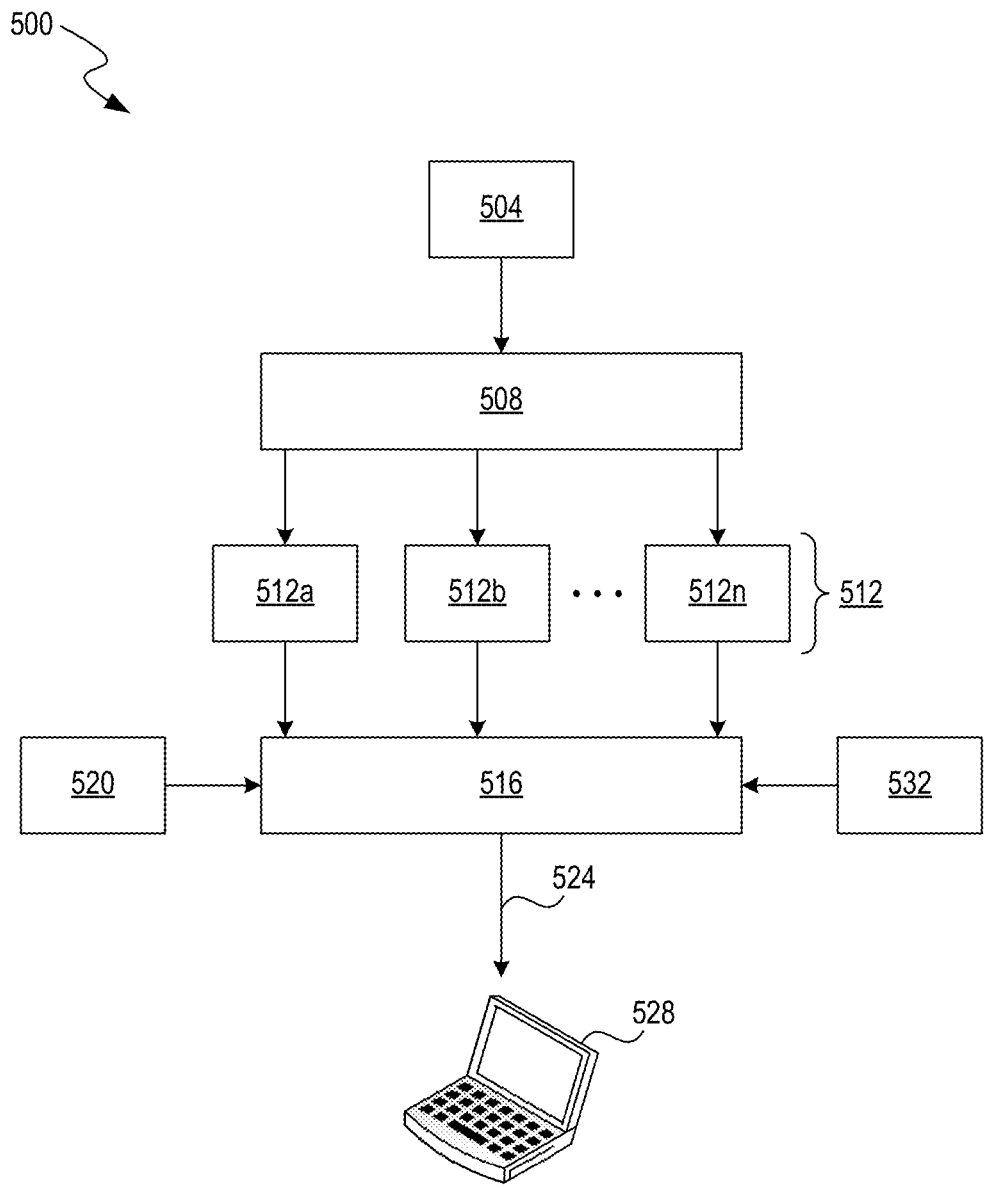
FIG. 5 is a block diagram illustrating an example machine learning (ML) system, in accordance with one or more embodiments.

FIG. 5 is a block diagram illustrating an example ML system 500, in accordance with one or more embodiments. The ML system 500 is implemented using components of the example computer system 600 illustrated and described in more detail with reference to FIG. 6. For example, the ML system 500 can be implemented on the computer system 600 using instructions programmed in the non-volatile memory 610 illustrated and described in more detail with reference to FIG. 6. Likewise, embodiments of the ML system 500 can include different and/or additional components or be connected in different ways. The ML system 500 is sometimes referred to as a ML module.

The ML system 500 includes a feature extraction module 208 implemented using components of the example computer system 600 illustrated and described in more detail with reference to FIG. 6. In some embodiments, the feature extraction module 208 extracts a feature vector 512 from input data 504. The feature vector 512 includes features 512a, 512b, . . . , 512n. The feature extraction module 508 reduces the redundancy in the input data 504, e.g., repetitive data values, to transform the input data 504 into the reduced set of features 512, e.g., features 512a, 512b, . . . , 512n. The feature vector 512 contains the relevant information from the input data 504, such that events or data value thresholds of interest can be identified by the ML model 516 by using this reduced representation. In some example embodiments, the following dimensionality reduction techniques are used by the feature extraction module 508: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 516 performs deep learning (also known as deep structured learning or hierarchical learning) directly on the input data 504 to learn data representations, as opposed to using task-specific algorithms. In deep learning, no explicit feature extraction is performed; the features 512 are implicitly extracted by the ML system 500. For example, the ML model 516 can use a cascade of multiple layers of nonlinear processing units for implicit feature extraction and transformation. Each successive layer uses the output from the previous layer as input. The ML model 516 can thus learn in supervised (e.g., classification) and/or unsupervised (e.g., pattern analysis) modes. The ML model 516 can learn multiple levels of representations that correspond to different levels of abstraction, wherein the different levels form a hierarchy of concepts. In this manner, the ML model 516 can be configured to differentiate features of interest from background features.

In alternative example embodiments, the ML model 516, e.g., in the form of a CNN generates the output 524, without the need for feature extraction, directly from the input data 204. The output 524 is provided to the video displays 618 illustrated and described in more detail with reference to FIG. 6. The computer device 528 can be a server, laptop, desktop, computer, tablet, smartphone, smart speaker, etc., implemented using components of the example computer system 600 illustrated and described in more detail with reference to FIG. 6. In some embodiments, the steps performed by the ML system 500 are stored on non-volatile memory 610 for execution. In other embodiments, the output 524 is displayed on the computer device 528.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 516 can be a CNN that includes both convolutional layers and max pooling layers. The architecture of the ML model 516 can be "fully convolutional," which means that variable sized sensor data vectors can be fed into it. For all convolutional layers, the ML model 516 can specify a kernel size, a stride of the convolution, and an amount of zero padding applied to the input of that layer. For the pooling layers, the model 516 can specify the kernel size and stride of the pooling.

In some embodiments, the ML system 500 trains the ML model 516, based on the training data 520, to correlate the feature vector 512 to expected outputs in the training data 520. As part of the training of the ML model 516, the ML system 500 forms a training set of features and training labels by identifying a positive training set of features that have been determined to have a desired property in question, and, in some embodiments, forms a negative training set of features that lack the property in question.

The ML system 500 applies ML techniques to train the ML model 516, that when applied to the feature vector 512, outputs indications of whether the feature vector 512 has an associated desired property or properties, such as a probability that the feature vector 512 has a particular Boolean property, or an estimated value of a scalar property. The ML system 500 can further apply dimensionality reduction (e.g., via linear discriminant analysis (LDA), PCA, or the like) to reduce the amount of data in the feature vector 512 to a smaller, more representative set of data.

The ML system 500 can use supervised ML to train the ML model 516, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 532 is formed of additional features, other than those in the training data 520, which have already been determined to have or to lack the property in question. The ML system 500 applies the trained ML model 516 to the features of the validation set 532 to quantify the accuracy of the ML model 516. Common metrics applied in accuracy measurement include: Precision and Recall, where Precision refers to a number of results the ML model 516 correctly predicted out of the total it predicted, and Recall is a number of results the ML model 516 correctly predicted out of the total number of features that had the desired property in question. In some embodiments, the ML system 500 iteratively re-trains the ML model 516 until the occurrence of a stopping condition, such as the accuracy measurement indication that the ML model 516 is sufficiently accurate, or a number of training rounds having taken place. The validation set 532 can be generated based on analysis to be performed.

Figure 6:
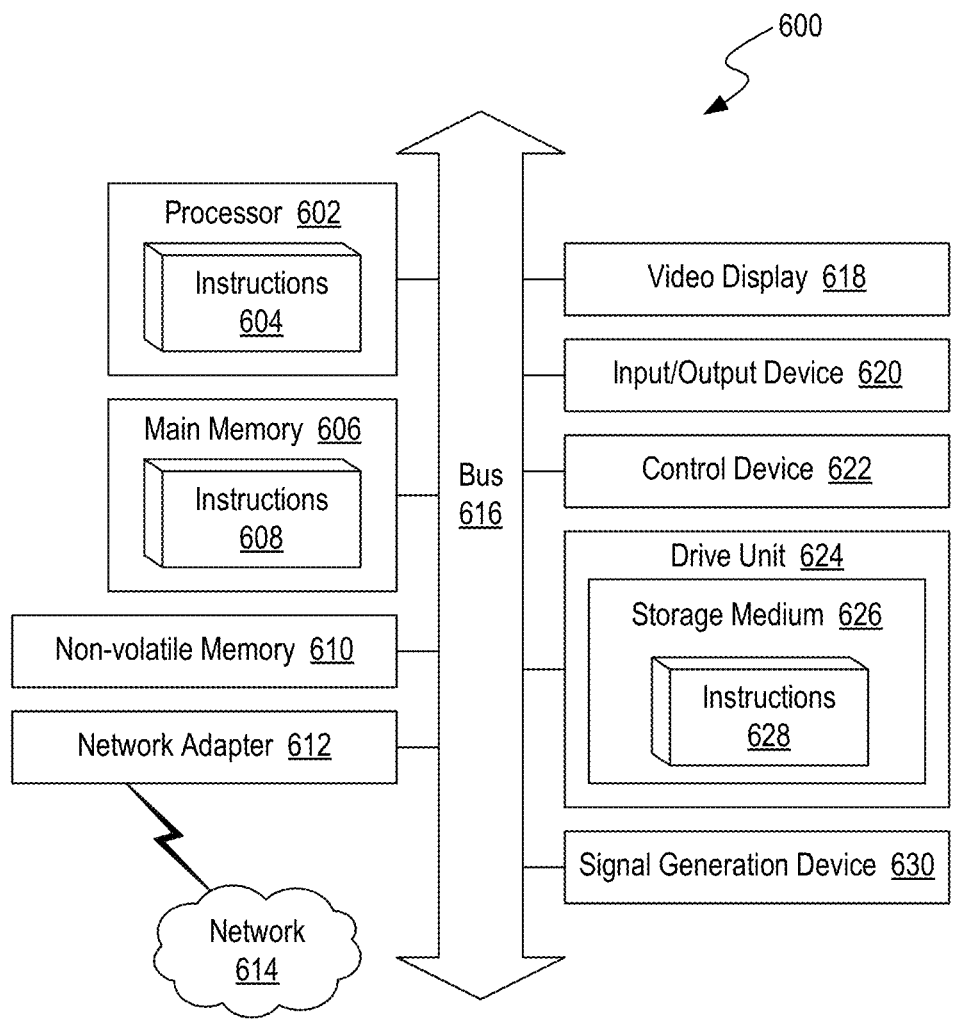
FIG. 6 is a block diagram illustrating an example computer system, in accordance with one or more embodiments.

FIG. 6 is a block diagram illustrating an example computer system 600, in accordance with one or more embodiments. Components of the example computer system 600 can be used to implement the systems illustrated and described in more detail with reference to FIGS. 1a-b. In some embodiments, components of the example computer system 600 are used to implement the ML system 500 illustrated and described in more detail with reference to FIG. 5. At least some operations described herein can be implemented on the computer system 600.

The computer system 600 can include one or more central processing units ("processors") 602, main memory 606, non-volatile memory 610, network adapters 612 (e.g., network interface), video displays 618, input/output devices 620, control devices 622 (e.g., keyboard and pointing devices), drive units 624 including a storage medium 626, and a signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 600 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the computer system 600.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 604, 608, 628) set at various times in various memory and storage devices in a computer device. When read and executed by the one or more processors 602, the instruction(s) cause the computer system 600 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 612 enables the computer system 600 to mediate data in a network 614 with an entity that is external to the computer system 600 through any communication protocol supported by the computer system 600 and the external entity. The network adapter 612 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 612 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A computer-implemented method for a contention-based protocol, the method comprising:
   transmitting, by a wireless transceiver, a wireless transmission to a wireless device in a first communication channel of a 6 Gigahertz (Ghz) band;
   receiving, by the wireless transceiver, a radio signal in the first communication channel from a wireless access point;
   continually monitoring, by the wireless transceiver, the radio signal for incumbent traffic in the 6 Ghz band,
   detecting, by the wireless transceiver, the incumbent traffic in the first communication channel;
      wherein detecting the incumbent traffic in the first communication channel comprises determining presence of Additive White Gaussian Noise (AWGN) in the first communication channel;
   in response to detecting the incumbent traffic in the first communication channel:
      stopping, by the wireless transceiver, the wireless transmission to the wireless device in the first communication channel in accordance with the contention-based protocol; and
      transmitting, by the wireless transceiver, at least one of a channel switch announcement (CSA), a duplicate beacon, or CSA information in a second communication channel of the 6 Ghz band; and
   in response to transmitting the at least one of a CSA, a duplicate beacon, or CSA information:
      switching, by the wireless transceiver, the wireless transmission to the wireless device to the second communication channel.

2. The method of claim 1, comprising:
   determining, by the wireless transceiver, absence of the incumbent traffic in the first communication channel; and
   in response to determining the absence of the incumbent traffic, switching, by the wireless transceiver, the wireless transmission to the wireless device to the first communication channel.

3. The method of claim 1, wherein the wireless transmission to the wireless device in the first communication channel is performed using a first bandwidth, the method comprising:
   in response to detecting the incumbent traffic in the first communication channel, performing the wireless transmission to the wireless device in the first communication channel using a second bandwidth less than the first bandwidth.

4. The method of claim 1, wherein the wireless transmission to the wireless device in the first communication channel is performed using a particular bandwidth, and
   wherein the wireless transmission to the wireless device in the second communication channel is performed using the particular bandwidth.

5. The method of claim 1, wherein the incumbent traffic is first incumbent traffic, the method comprising:
   detecting, by the wireless transceiver, second incumbent traffic in the second communication channel; and
   in response to detecting the second incumbent traffic in the second communication channel,
      switching the wireless transmission to the wireless device to a third communication channel of the 6 Ghz band.

6. The method of claim 1, wherein the wireless transmission to the wireless device in the first communication channel is performed using a first bandwidth, and
   wherein the incumbent traffic is first incumbent traffic, the method comprising:
   detecting, by the wireless transceiver, second incumbent traffic in the second communication channel; and
   in response to detecting the second incumbent traffic in the second communication channel,
      performing the wireless transmission to the wireless device in the second communication channel using a second bandwidth less than the first bandwidth.

7. The method of claim 1, wherein the detecting of the incumbent traffic in the first communication channel is performed in response to booting the wireless transceiver.

8. A system for a contention-based protocol, the system comprising:
   one or more computer processors; and
   a non-transitory computer-readable storage medium storing computer instructions, which, when executed by the one or more computer processors cause the system to:
   boot a wireless transceiver;
   in response to booting the wireless transceiver, continually monitor a radio signal in a first communication channel of a 6 Gigahertz (Ghz) band for incumbent traffic in the 6 Ghz band;
   detect the incumbent traffic in the first communication channel,
      wherein the instructions to detect the incumbent traffic cause the system to determine presence of Additive White Gaussian Noise (AWGN);
   in response to detecting the incumbent traffic,
      transmit a channel switch announcement (CSA) in a second communication channel of the 6 Ghz band; and
   in response to transmitting the CSA,
      wirelessly transmit to a wireless device in the second communication channel.

9. The system of claim 8, wherein the instructions cause the system to:
   in response to detecting the incumbent traffic,
      transmit a duplicate beacon in the second communication channel of the 6 Ghz band.

10. The system of claim 8, wherein the instructions cause the system to:
   determine absence of the incumbent traffic in the first communication channel; and
   in response to determining the absence of the incumbent traffic, switch wireless transmission to the first communication channel.

11. The system of claim 8, wherein the wireless transmission in the first communication channel is performed using a first bandwidth, and the instructions cause the system to:
in response to detecting the incumbent traffic, perform the wireless transmission in the first communication channel using a second bandwidth less than the first bandwidth.

12. The system of claim 8, wherein the wireless transmission in the first communication channel is performed using a particular bandwidth, and
wherein the wireless transmission in the second communication channel is performed using the particular bandwidth.

13. The system of claim 8, wherein the incumbent traffic is first incumbent traffic, and the instructions cause the system to:
detect second incumbent traffic in the second communication channel; and
in response to detecting the second incumbent traffic, switch wireless transmission to the wireless device to a third communication channel of the 6 Ghz band.

14. The system of claim 8, wherein wireless transmission to the wireless device in the first communication channel is performed using a first bandwidth,
wherein the incumbent traffic is first incumbent traffic, and
wherein the instructions cause the system to:
detect second incumbent traffic in the second communication channel; and
in response to detecting the second incumbent traffic, perform the wireless transmission to the wireless device in the second communication channel using a second bandwidth less than the first bandwidth.

15. A non-transitory computer-readable storage medium storing computer instructions, which, when executed by one or more computer processors cause the one or more computer processors to:
boot a wireless transceiver;
in response to booting the wireless transceiver, continually monitor a radio signal in a first communication channel of a 6 Gigahertz (Ghz) band for incumbent traffic in the 6 Ghz band;
detect the incumbent traffic in the first communication channel,
wherein the instructions to detect the incumbent traffic cause the system to determine presence of Additive White Gaussian Noise (AWGN);
in response to detecting the incumbent traffic,
transmit a channel switch announcement (CSA) in a second communication channel of the 6 Ghz band; and
in response to transmitting the CSA,
wirelessly transmit to a wireless device in the second communication channel.

16. The storage medium of claim 15, wherein the instructions cause the one or more computer processors to:
in response to detecting the incumbent traffic,
transmit a duplicate beacon in the second communication channel of the 6 Ghz band.

17. The storage medium of claim 15, wherein the instructions cause the one or more computer processors to:
determine absence of the incumbent traffic in the first communication channel; and
in response to determining the absence of the incumbent traffic, switch wireless transmission to the first communication channel.

18. The storage medium of claim 15, wherein wireless transmission in the first communication channel is performed using a particular bandwidth, and
wherein, in response to detecting the incumbent traffic, one or more computer processors perform the wireless transmission in the first communication channel using a second bandwidth less than the first bandwidth.

* * * * *